(12) United States Patent
Pollack

(10) Patent No.: US 6,742,844 B2
(45) Date of Patent: Jun. 1, 2004

(54) SUBASSEMBLY FOR A VEHICLE SEAT, IN PARTICULAR A FITTING

(75) Inventor: Paul Pollack, Bad Münster/Eberburg (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 10/337,640

(22) Filed: Jan. 7, 2003

(65) Prior Publication Data

US 2003/0102704 A1 Jun. 5, 2003

Related U.S. Application Data

(63) Continuation of application No. PCT/EP02/03790, filed on Apr. 5, 2002.

(30) Foreign Application Priority Data

Apr. 12, 2001 (DE) .......................................... 101 18 358

(51) Int. Cl.[7] ................................................ B60N 2/02
(52) U.S. Cl. ..................................... 297/367; 297/366
(58) Field of Search ................................ 297/367, 366; 475/341, 176, 177, 162

(56) References Cited

U.S. PATENT DOCUMENTS

| | | | |
|---|---|---|---|
| 4,218,092 A | * | 8/1980 | Schach et al. .............. 297/367 |
| 5,681,086 A | | 10/1997 | Baloche |
| 6,007,153 A | * | 12/1999 | Benoit et al. ........... 297/378.12 |
| 6,318,805 B1 | * | 12/2001 | Asano ......................... 297/367 |
| 6,328,382 B1 | * | 12/2001 | Yamashita ................... 297/367 |
| 6,332,649 B1 | * | 12/2001 | Vossmann .................... 297/366 |
| 6,454,354 B1 | | 9/2002 | Vossmann et al. |
| 6,491,440 B1 | * | 12/2002 | Sahashi et al. .............. 384/544 |

FOREIGN PATENT DOCUMENTS

| | | | |
|---|---|---|---|
| DE | 258 248 A1 | 7/1988 | |
| DE | 298 826 A5 | 5/1994 | |
| DE | 19904299 C1 | * 6/2000 | ............ B60N/2/02 |
| EP | 0 720 930 A1 | 7/1996 | |
| GB | 2 156 901 A | 10/1985 | |
| WO | WO 00/44582 | 8/2000 | |

* cited by examiner

Primary Examiner—Peter M. Cuomo
Assistant Examiner—Stephen D'Adamo
(74) Attorney, Agent, or Firm—Alston & Bird LLP

(57) ABSTRACT

In the case of a subassembly for a vehicle seat, in particular a fitting for a motor vehicle seat, having a first component (11) and having a second component (12, 21) which can move relative to the first component (11) and by means of regions (15, 17, 19) which are assigned to the first component (11) is mounted, guided and/or supported with respect to the first component (11) or interacts therewith in another manner, the first component (11) is at least partially hardened.

18 Claims, 2 Drawing Sheets

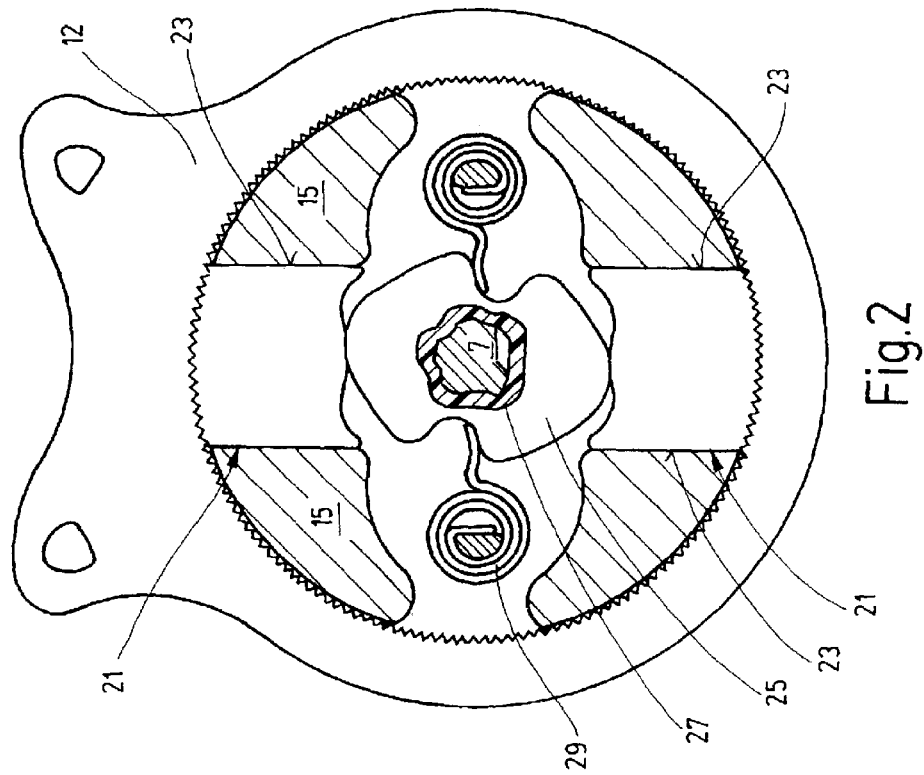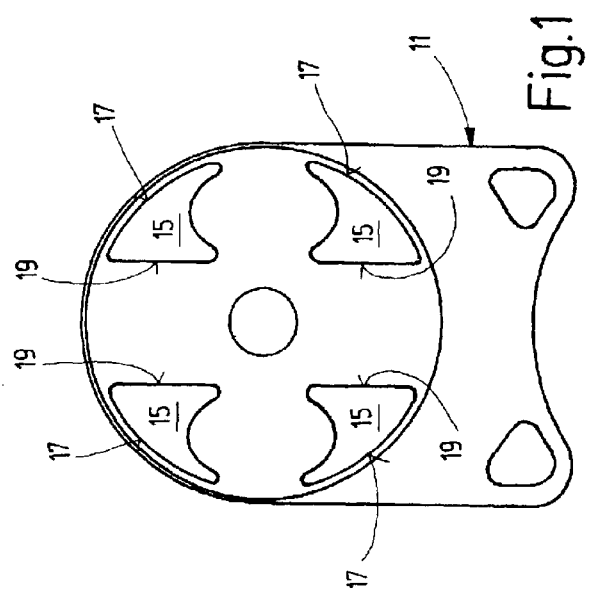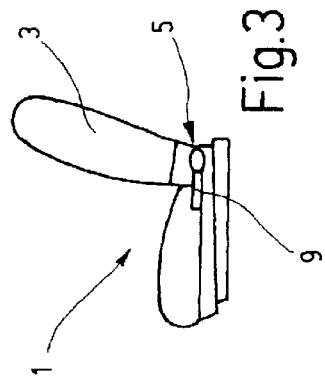

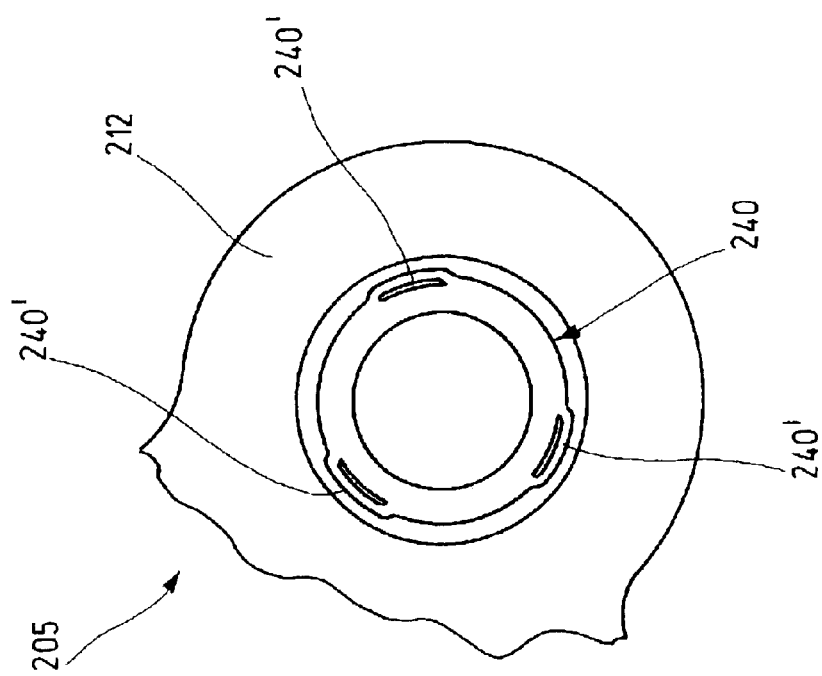
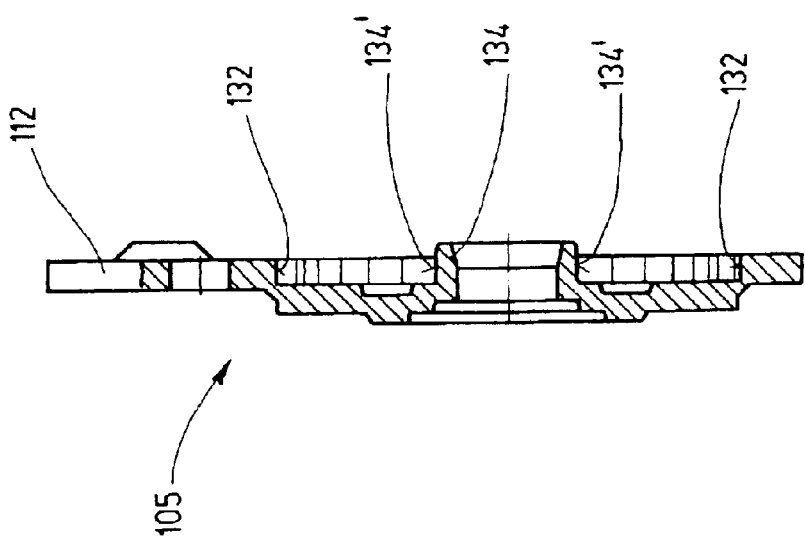

SUBASSEMBLY FOR A VEHICLE SEAT, IN PARTICULAR A FITTING

CROSS-REFERENCE TO RELATED APPLICATION

This is a continuation of PCT/EP02/03790, which was filed Apr. 5, 2002, published in German, and is entirely incorporated herein by reference.

BACKGROUND OF THE INVENTION

The present invention relates to a subassembly for a vehicle seat and, more particularly, to a fitting for a motor vehicle seat.

WO 00/44582 discloses a subassembly which is designed as a fitting and is provided as an inclination adjuster for the backrest of a vehicle seat. Frequent changes in the inclination of the backrest result in a certain amount of wear in the long term.

BRIEF SUMMARY OF THE INVENTION

One aspect of the present invention is the provision of an improved subassembly for a vehicle seat, in particular a fitting for a motor vehicle seat, having a first component and a second component which can move relative to the first component. By way of regions which are assigned to the first component, the second component is mounted, guided and/or supported with respect to the first component or interacts therewith in another manner. The first component is at least partially hardened.

By virtue of the first component (and preferably also the second component) being at least partially hardened, the wear behavior can be significantly improved and, by increasing the fatigue strength, the service life of the subassembly can be significantly increased. The clearance which is present is not enlarged, so that malfunctions of the fitting are avoided. In addition, a relatively high surface pressure is possible in the hardened regions, which increases the range of use of the fitting according to the invention.

In order to keep the increased outlay and production low in terms of costs and in order not to change the static and dynamic behavior of the component to a great extent, the first component is preferably hardened only in those regions which interact with components of the fitting which can move relative to the first component, for example the bearing and/or the guide and/or other supports, and, in particular, is preferably only hardened locally, i.e. on the bearing surfaces, guide surfaces, tooth surfaces and other supporting surfaces, and is otherwise unhardened. The reduction in the wear does not affect the geometrical qualities of these supporting surfaces.

In a particularly preferred embodiment, the hardened regions are specifically hardened in the boundary layer by means of a laser. In comparison with case hardening or induction hardening, this method has the advantage that a better dimensional stability can be obtained, that specific hardening with a defined hardening zone geometry can take place in certain regions, and that only a small distortion of the component occurs after cooling. Owing to the low drawing-in of heat, which is caused by the method, after the hardening process, the component can be immediately further processed. A quenching medium is not required, since automatic quenching takes place, i.e. the heat, which is introduced, is dissipated into the cold base material predominantly by thermal conduction. In addition, a more cost-effective use within a fully automatic installation system is possible.

BRIEF DESCRIPTION OF THE DRAWINGS

The invention is explained in greater detail below with reference to three exemplary embodiments illustrated in the drawing, in which:

FIG. 1 shows a view of a fitting lower part of the first exemplary embodiment,

FIG. 2 shows a section through the first exemplary embodiment,

FIG. 3 shows a vehicle seat equipped according to the invention,

FIG. 4 shows a section through a fitting upper part of the second exemplary embodiment, and FIG. 5 shows a partial view of a third exemplary embodiment in the region of a bearing bushing.

DETAILED DESCRIPTION OF THE INVENTION

In the first exemplary embodiment, a vehicle seat 1 for a motor vehicle for the adjustment of the inclination of its backrest 3 has, as a subassembly on both of its sides, a respective fitting 5 which is designed as a latching fitting. The two fittings 5 are in a geared connection to each other by means of a transmission rod 7. A hand lever 9, which fits in a rotationally fixed manner on the transmission rod 7, is used for the manual actuating of the fittings 5. The following directional details refer to the cylinder coordinate system defined by the transmission rod 7.

Each fitting 5 has a fitting lower part 11 as the first fitting part and a fitting upper part 12 as the second fitting part. The upper and lower parts 11, 12 are held together in the axial direction by retaining plates (not illustrated in detail). Four guide and bearing segments 15 of virtually quarter-circle-shaped profile are integrally formed on the fitting lower part 11, which is fixed on the seat part. Each guide and bearing segment 15 has, radially on the outside, a narrow bearing surface 17 which is curved around the center of the fitting lower part 11. The four bearing surfaces 17 together form a cylindrically shaped bearing surface, which is interrupted four times, for a correspondingly curved, radially inwardly pointing bearing surface of the fitting upper part 12 which is designed as a ring gear and is fixed on the backrest. Each guide and bearing segment 15 furthermore has a narrow, planar guide surface 19 running in the radial direction. Two guide surfaces 19 in each case together form a radial guide for a toothed segment 21 which is arranged such that it can move radially.

Each toothed segment 21 bears as a latch, a multiplicity of teeth on a side placed radially further outward, which teeth can interact with corresponding teeth of the fitting upper part 12 and the bearing surface thereof, in order to lock the fitting 5. Two guide sides 23, which run parallel to the radial direction, bear against the guide surfaces 19 of the associated two guide and bearing segments 15. The radially inwardly placed side of the toothed segment 21 bears against an eccentric disk 25 having eccentrically curved clamping surfaces. The eccentric disk 25 is seated in a rotationally fixed manner on the transmission rod 7 by means of a bushing-shaped transmission element 27 and is prestressed in the circumferential direction by two spiral springs 29 in order to lock the fitting 5 by pressing on the toothed segments 21. A driver disk (not illustrated for reasons of clarity) which is also seated in a rotationally fixed manner on the transmission rod 7 by means of the transmission element 27 and which interacts in a manner known per se with the two toothed segments 21 via pin-and-slot guides, is used for returning the toothed segments 21 inward in the radial direction, i.e. for the unlocking process which is initiated by a rotation of the transmission rod 7 by means of the hand lever 9.

The four guide and bearing segments 15 are hardened locally in the region of their bearing surfaces 17 and their guide surfaces 19 including in each case a narrow, adjacent region, while the remaining regions and the fitting lower part 11 are unhardened, i.e. remain soft. The surfaces interacting with these surfaces, i.e. the internal toothing of the fitting upper part 12 and the guide sides 23 of the toothed segments 21, can also be hardened. The hardening takes place by means of a laser. This method with a specific, local application of heat and integral quenching results in only a small distortion of a component. At the same time, the wear of the supporting surfaces in the case of frequent stress is greatly reduced, and higher surface pressures can be absorbed.

In the second exemplary embodiment, a fitting 105 has a fitting upper part 112 which is designed as a ring gear. For this purpose, the fitting upper part 112 has a radially inwardly pointing toothing 132 on the circumferential surface of a cup-shaped depression. The tooth flanks and tooth heads of the toothing 132 are laser hardened. Furthermore, the fitting upper part 112 has, in its center, a collar formation 134 which is used as a bearing and whose outer circumferential surface 134' is likewise laser hardened.

The third exemplary embodiment relates to a wobble fitting 205 with a central free pivoting means which is placed on it and acts between a fitting upper part 212 and those parts of the wobble fitting 205 which contain the gear. For this function, a bearing bushing 240 is provided in the bearing of the fitting upper part 212, said bushing having, on its radially outwardly pointing circumferential surface, three regions 240' which are offset with respect to one another, slightly protrude radially and are laser hardened.

Unless explained in greater detail, the exemplary embodiments correspond or are designed in a manner known per se.

That which is claimed:

1. A subassembly for a vehicle seat, comprising:
    a first component and a second component that is mounted for moving relative to the first component, wherein:
    the first component includes one or more interacting regions for interacting with the second component,
    the first component is at least partially locally laser hardened in one or more of the one or more interacting regions and is otherwise unhardened, whereby the one or more locally laser hardened interacting regions are harder than regions of the first component that are not hardened,
    each of the one or more locally laser hardened interacting regions consists essentially of:
      one or more surfaces, and
      for each surface of the one or more surfaces, an narrow region adjacent to the surface, and
    the one or more surfaces are selected from the group consisting of:
      one or more surfaces which form a bearing that interacts with the second component,
      one or more surfaces which form a guide that guides the movement of the second component relative to the first component,
      one or more surfaces which form a toothing that is for interacting with the second component, and
      one or more surfaces which support the second component.

2. A subassembly according to claim 1, wherein the second component includes one or more interacting regions for interacting with the first component, and the second component is at least partially hardened in at least one of the one or more regions of the second component.

3. A subassembly according to claim 1, wherein the subassembly is a fitting, the one or more surfaces include one or more surfaces which form toothing, and the one or more surfaces which form the toothing are selected from the group consisting of:
    tooth flanks of a tooth part, and
    tooth heads of the tooth part.

4. A subassembly according to claim 1, wherein the subassembly is a fitting that is mounted to the vehicle seat for adjusting inclination of a backrest of the vehicle seat, whereby the fitting is in combination with the vehicle seat.

5. A subassembly according to claim 1, wherein the one or more surfaces include guide surfaces of guide and bearing segments.

6. A subassembly according to claim 1, wherein the one or more surfaces include bearing surfaces of guide and bearing segments.

7. A subassembly according to claim 1, wherein the one or more surfaces include a bearing surface of a collar formation.

8. A subassembly according to claim 7, wherein the bearing surface of the collar formation is an outer circumferential bearing surface of the collar formation.

9. A subassembly according to claim 1, wherein the one or more surfaces include a bearing surface of a bushing.

10. A subassembly according to claim 9, wherein the bearing surface of the bushing is an outer circumferential bearing surface of the bushing.

11. A subassembly according to claim 1, wherein:
    the subassembly is a fitting;
    the first and second components respectively are first and second fitting parts mounted for there being relative rotation therebetween; and
    the one or more surfaces include a bearing surface of the first fitting part, and the bearing surface interacts with the second fitting part for at least partially rotatably supporting one of the first and second fitting parts relative to the other of the first and second fitting parts.

12. A subassembly according to claim 11, wherein the bearing surface is part of a guide and bearing segment of the first fitting part.

13. A subassembly according to claim 12, wherein the bearing surface is a bearing surface of a collar formation of the first fitting part.

14. A subassembly according to claim 13, wherein the bearing surface of the collar formation is an outer circumferential bearing surface of the collar formation.

15. A subassembly according to claim 1, wherein:
    the subassembly is a latching fitting;
    the first component is a first fitting part;
    the latching fitting further includes a second fitting part;
    the first and second fitting parts are mounted for there being relative rotation therebetween about an axis;
    the one or more surfaces include guide surfaces which form a guide, wherein the guide is fixed with respect to the first fitting part; and
    the second component is a latch which is movably positioned in the guide for moving radially between an inner unlocking position and an outer locking position, with the latch engaging the first and second fitting parts to prevent relative rotation therebetween while the latch is in the outer locking position.

16. A subassembly according to claim 15, wherein the guide surfaces respectively are guide surfaces of guide and bearing segments.

17. A subassembly according to claim 1, wherein:

the subassembly is a fitting;

the fitting further includes a first fitting part;

the second component is a second fitting part;

the first and second fitting parts are mounted for there being relative rotation therebetween;

the first component is a bearing bushing positioned between the first and second fitting parts for rotatably supporting one of the first and second fitting parts relative to the other of the first and second fitting parts; end the one or more surfaces include a bearing surface of the bearing bushing.

18. A subassembly according to claim 17, wherein the bearing surface of the bearing bushing is an outer circumferential bearing surface of the bearing bushing.

* * * * *